Feb. 12, 1952     G. F. SCHNEIDER     2,585,502
PROPELLER THRUST COORDINATING MECHANISM
Filed April 8, 1947     5 Sheets-Sheet 2
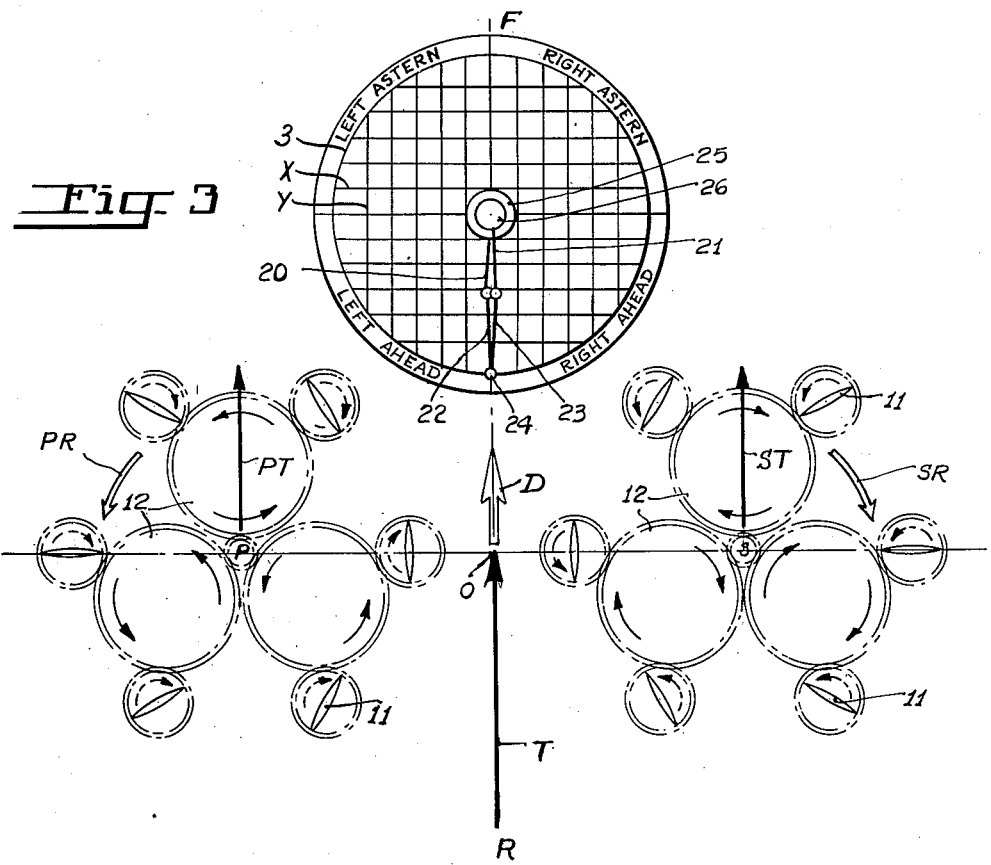
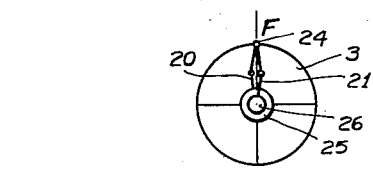
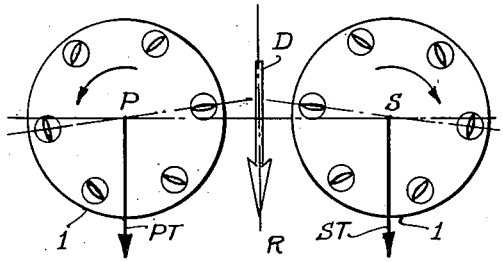
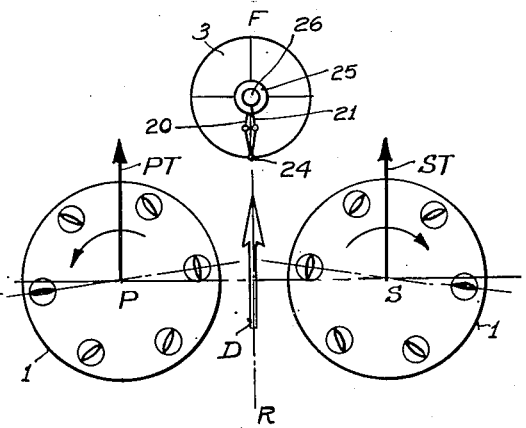
Inventor
GEORGE F. SCHNEIDER
By Reynolds + Beach
Attorneys

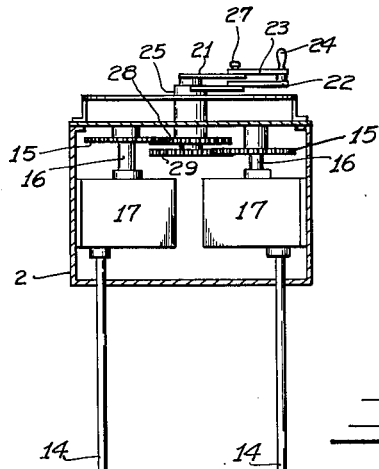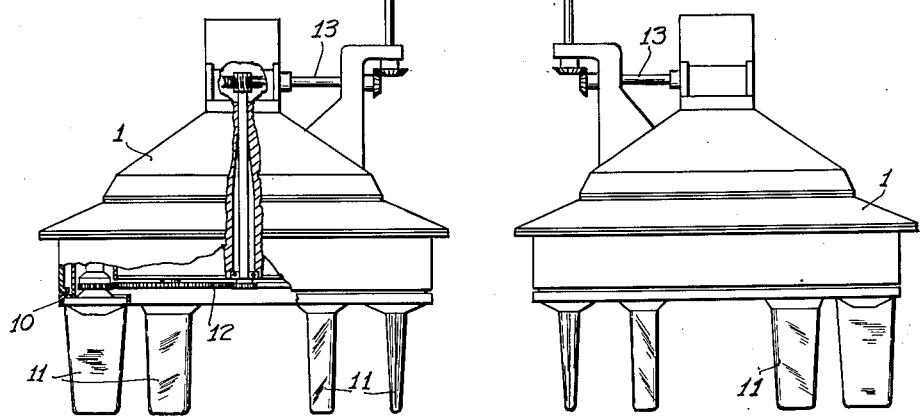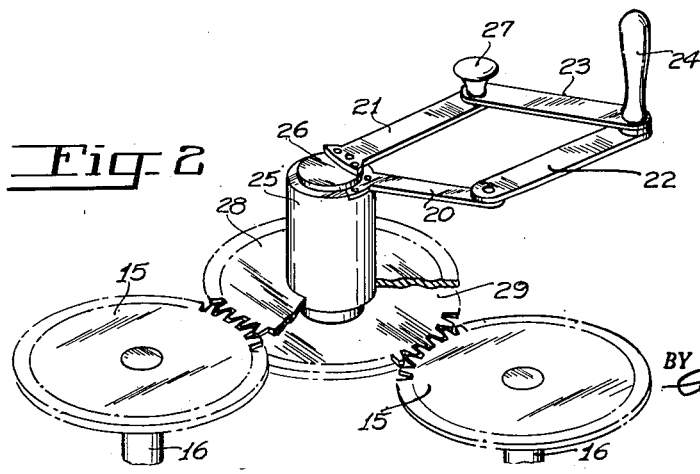

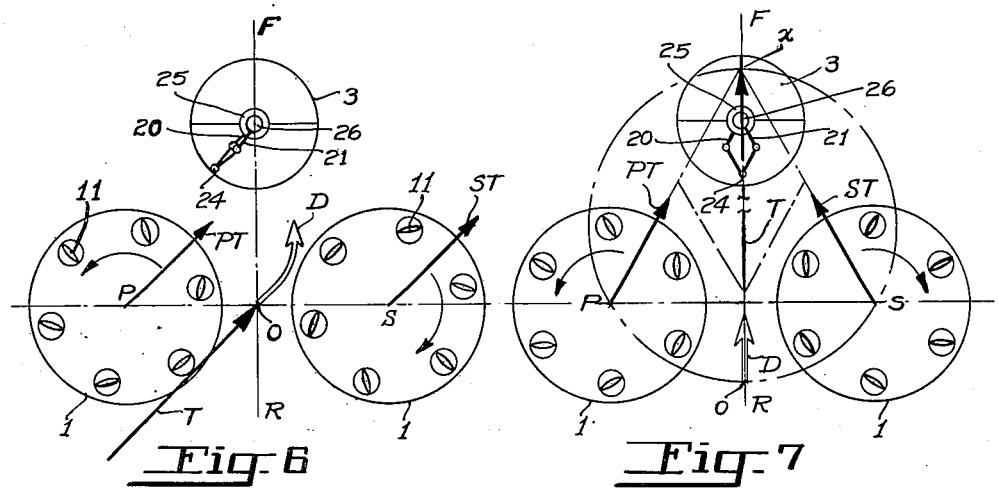
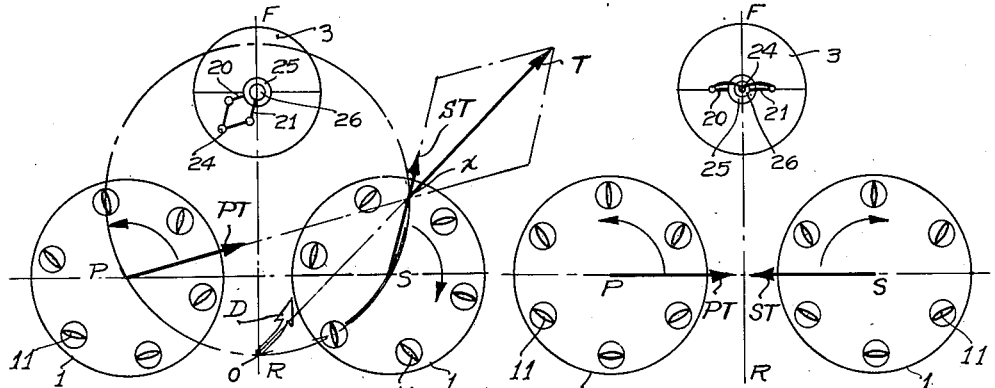
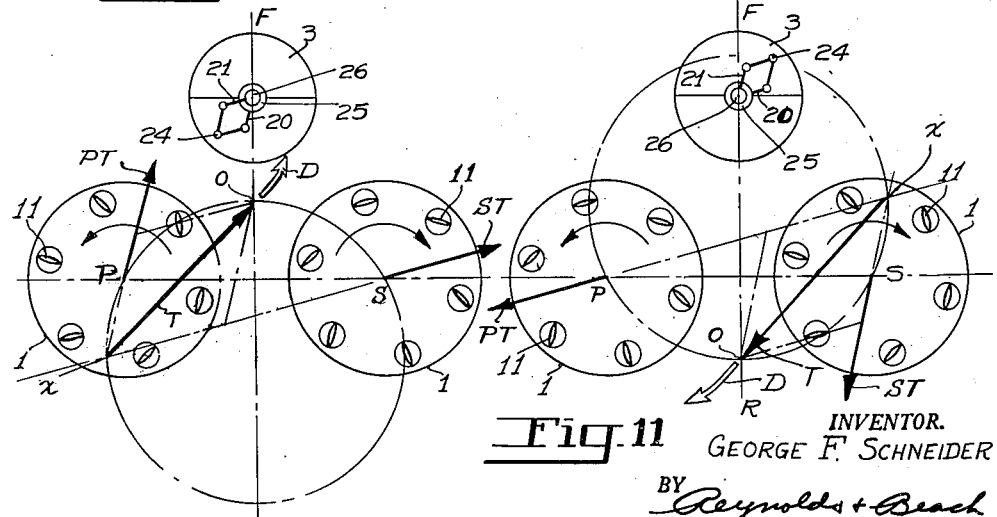

Feb. 12, 1952      G. F. SCHNEIDER      2,585,502
PROPELLER THRUST COORDINATING MECHANISM
Filed April 8, 1947      5 Sheets-Sheet 4
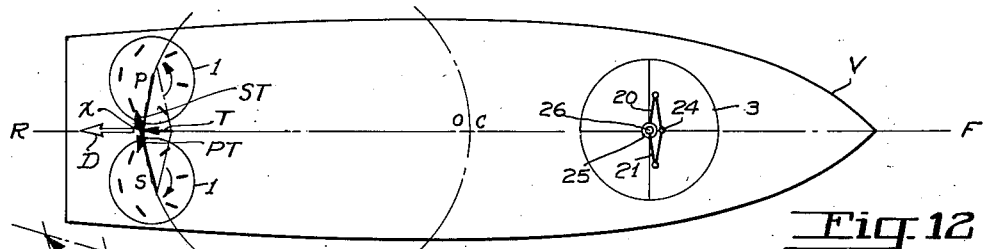
_Fig.12_
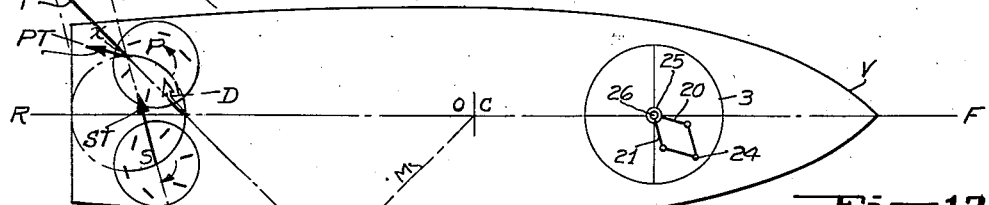
_Fig.13_
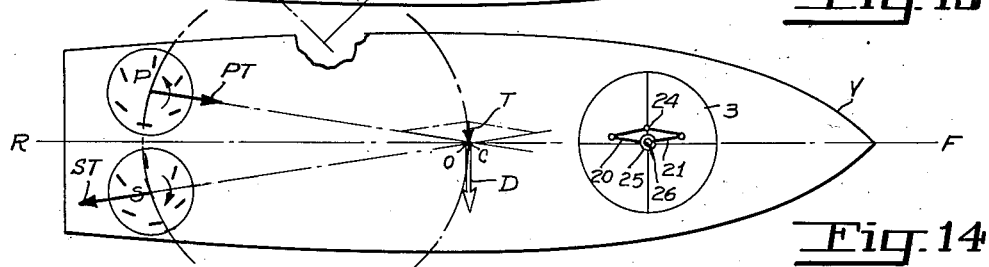
_Fig.14_
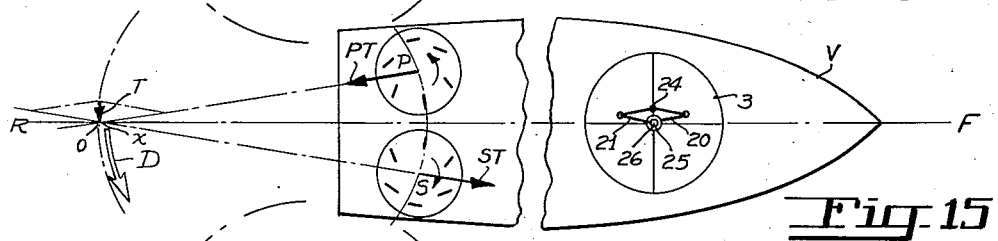
_Fig.15_
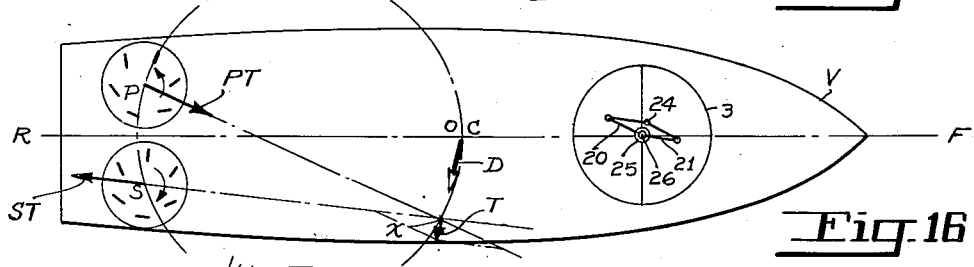
_Fig.16_
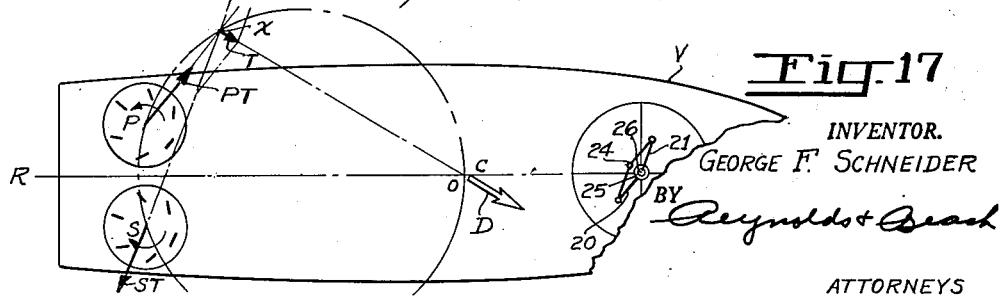
_Fig.17_
INVENTOR.
GEORGE F. SCHNEIDER
BY
Reynolds & Beach
ATTORNEYS INVENTOR
GEORGE F. SCHNEIDER
BY Reynolds + Beach
ATTORNEYS Patented Feb. 12, 1952

2,585,502

UNITED STATES PATENT OFFICE 2,585,502

PROPELLER THRUST COORDINATING MECHANISM

George F. Schneider, Shaker Heights, Ohio, assignor to Kurt F. J. Kirsten, Seattle, Wash.

Application April 8, 1947, Serial No. 740,223

11 Claims. (Cl. 115—52)

The control mechanism of this invention is particularly useful for coordinating the directions of the thrust vectors for twin cycloidal propellers to produce the resultant thrust desired, although it may be used for coordinating the thrust direction of even screw propellers swingably mounted to alter their thrust directions. Such an installation, especially of cycloidal propellers having a fixed pitch ratio, may benefit greatly from the use of this invention.

Within the term "cycloidal propellers" I include all propellers which rotate about an axis extending transversely of the direction of thrust produced by them, and like propellers which have individual thrust direction control mechanisms adjustable to enable the thrust to be altered to various directions transversely of the rotative axis of the propeller or of the axis about which the thrust directions may be varied. A typical fixed pitch ratio marine propeller, having a $\pi$ pitch ratio, is disclosed in Kirsten Patent No. 1,740,820, issued December 24, 1929. Such a propeller having a $\pi$ pitch ratio has a radial blade and a tangential blade in diametrically opposite positions, and all the blades have orbital angular velocities equal to twice their rotative velocities about their individual axes, so that each blade turns about its own axis only a half revolution for revolution of the propeller. In such a propeller the ratio of its pitch to its blade circle diameter is $\pi$ or 3.14159. It will be understood, however, that this invention is not restricted to that particular type of propeller, nor even to fixed pitch ratio cycloidal propellers. Moreover, the control mechanism of the invention may be utilized for controlling cycloidal propellers used for aircraft propulsion or for other purposes besides marine application, although the invention will be described particularly in connection with the latter type of installation as representative.

The direction in which the thrust produced by a cycloidal propeller acts may be altered by turning simultaneously all the blades of the propeller through equal angles. Without altering either the speed or direction of rotation of such a propeller, the angles of its blades thus may be adjusted to change the thrust direction through 180 degrees, such as from directly astern to directly ahead. The amount of thrust produced by a cycloidal propeller of fixed pitch ratio can not be changed, however, without changing the speed of propeller rotation or vehicle movement. The value of the resultant thrust effective for movement of the vehicle, such as a marine vessel, may, however, be controlled without change in the speed of propeller rotation if two fixed pitch ratio cycloidal propellers are used in side-by-side or paired relationship, to which reference is made hereafter as a twin cycloidal propeller installation.

In a twin cycloidal propeller installation it will be evident that if the direction of thrust produced by each propeller acts directly forwardly, the vessel will be moved forward by a resultant thrust which is the arithmetic sum of the individual thrusts produced by the two propellers. Conversely, if the thrusts of the two propellers act directly rearward, the vessel will be moved astern by a resultant thrust which is the arithmetic sum of the individual thrusts produced by the two propellers.

The net resultant thrust of the two propellers which produces a motive force on the vessel is equal to the arithmetic sum of the propeller thrusts only when the thrusts of the two propellers are parallel and directed in the same sense. If the thrusts of the two propellers act along the same thrust line in opposite directions, the net resultant propulsive force on the vessel, assuming the values of such thrusts to be equal, will be zero. If the thrusts of the propellers are not parallel or along a common line, the net resultant thrust exerted on the vessel is necessarily the vector sum of the two propeller thrusts, which resultant thrust can be regulated in magnitude as well as in direction without changing the value of the thrust of either propeller.

The theory of varying the amount and direction of the net propulsive thrust acting on a vessel merely by controlling independently the thrust directions of the propellers of a twin cycloidal propeller installation, without altering the magnitude of thrust developed by either propeller, is simple, but the operation of altering the amount of net thrust while maintaining or establishing a desired direction of thrust by independent manipulation of the individual thrust direction control mechanisms of each propeller presents an extremely difficult problem. The problem is rendered even more complex by the requirement that, for intricate maneuvers, frequently it is desired to change both the direction and amount of the resultant thrust with precision and almost instantaneously.

With this problem in mind of coordinating the thrusts of a twin cycloidal propeller installation, particularly as it is created by such an installation of cycloidal propellers each having a fixed pitch ratio, it is in an object of this invention to coordinate the movements of the individual thrust direction control mechanisms of the two propellers so that they may be adjusted simultaneously, and each to the extent required to effect the desired change, both in magnitude and direction, of the net resultant thrust exerted.

It is specifically an object to effect by a simple control manipulation a change either in direction, or in degree, or both, of the net resultant thrust applied to a vessel. A great advantage of my invention is that such a control action may be effected by movement of a single control member, the movement of which is directly related in a simple manner to the direction, and to approximately the degree, in which it is desired that the net resultant thrust act on the vessel.

A further advantage of my invention is that it can be adapted readily to various types of propeller thrust direction control mechanisms, being capable of employment with blade turning mechanisms actuated by an electric, a hydraulic, a mechanical or other type of control movement transmission, each of which types of transmission may include different species of structure.

The extreme simplicity of construction and ease of installation of my propeller thrust coordinating mechanism are decided advantages, as well as its adaptability to cycloidal propeller installations of different size, location and arrangement on the hull of a vessel.

Because of the great variety of propeller structures, types of installation, and thrust direction control mechanisms with which may thrust coordinator may be employed, it is illustrated in only a simple, typical application. A person familiar with cycloidal propellers can readily adapt the thrust coordinator to other kinds of propeller installations in light of the following description.

Figure 1 is a diagrammatic view of a twin π pitch ratio cycloidal propeller installation incorporating my thrust coordinating mechanism. Figure 2 is an enlarged perspective view showing the essential elements of the thrust coordinator.

Figure 3 is a diagrammatic representation of the thrust coordinator reference chart and the twin cycloidal propeller installation.

Figures 4 and 5 are diagrammatic views of my thrust coordinating mechanism and a twin cycloidal propeller installation which it controls, in which the thrust directions of the propellers are slightly divergent forward in full-speed-ahead position of the coordinator, and slightly convergent rearward in full-speed-astern position of the coordinator.

Figures 6 to 11, inclusive, are diagrammatic representations of my thrust coordinating mechanism in a twin cycloidal propeller installation, illustrating the coordinator in various adjusted positions, the resulting thrust directions of the propellers, and the consequent direction of movement of the ship, Figure 6 corresponding to a turn to port while the ship is moving forward, Figure 7 corresponding to straight, forward movement at reduced speed, Figure 8 corresponding to one condition of a turn to port while moving forward at reduced speed, Figure 9 corresponding to the condition of the ship standing stationary, Figure 10 corresponding to a situation in which the ship is turning to port while moving forward at reduced speed as an alternative to Figure 8, and Figure 11 corresponding to movement of the ship in reverse at reduced speed with its stern swinging to port.

Figure 18:
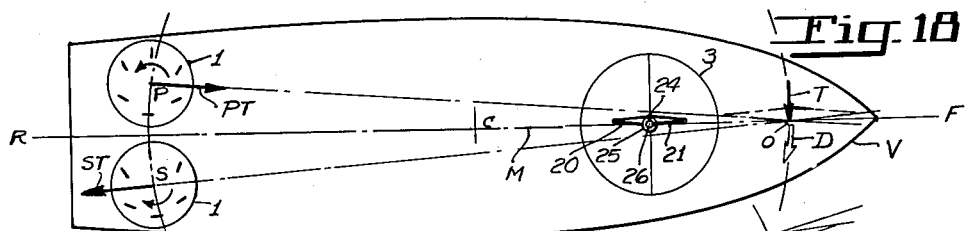
Figure 19:
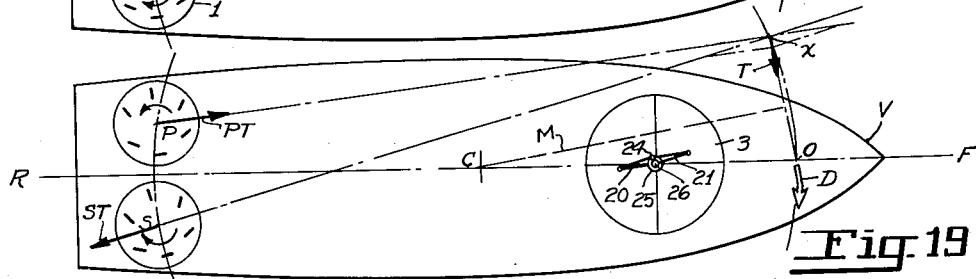
Figure 20:
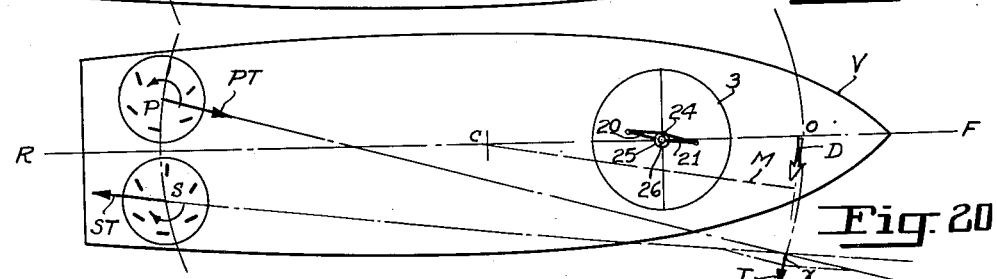
Figure 21:
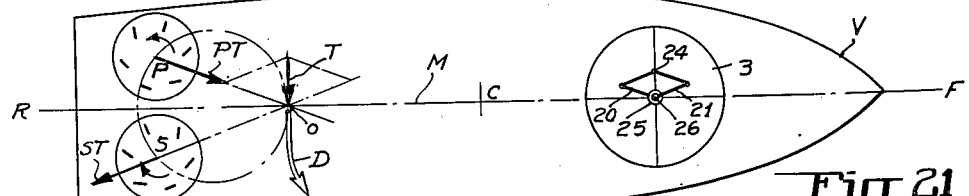
Figure 22:
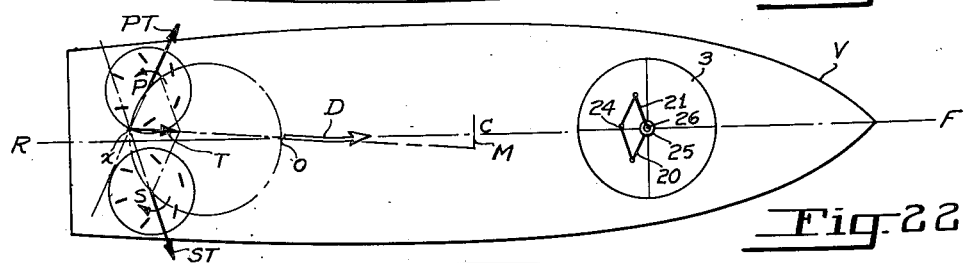
Figure 23:
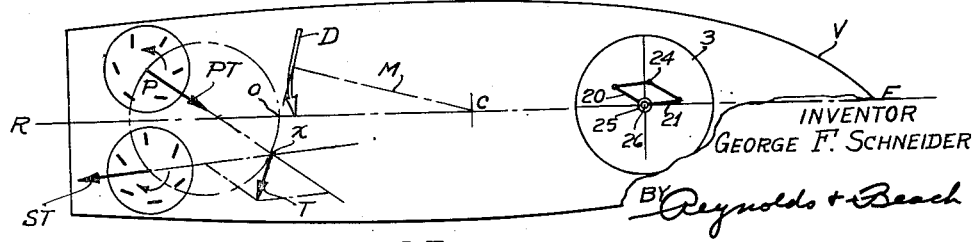

Figures 12 to 23, inclusive, are diagrammatic representations of a vessels equipped with my thrust coordinating device and a twin cycloidal propeller installation, illustrating adjusted positions of the coordinator in addition to those shown in Figures 6 to 11, the effect on the propeller thrusts, and the resulting movement of the ship, Figure 12 corresponding to astern movement of the ship at slow speed, Figure 13 corresponding to movement of the ship astern at reduced speed with its stern swinging to port as an alternate to the situation of Figure 11, Figure 14 illustrating an athwartships movement of the ship directly to starboard, Figure 15 indicating a rapid swinging of the stern to starboard without forward or astern movement of the ship, Figure 16 indicating an athwartships movement at slow speed to starboard, but also moving slightly astern, Figure 17 illustrating straight quartering movement of the ship forward and to starboard at slow speed, Figure 18 illustrating swinging of the bow to starboard at slow speed without longitudinal movement of the ship, Figure 19 illustrating a movement similar to Figure 18 but with the ship moving slightly ahead, Figure 20 also portraying a situation similar to Figure 18, but with the ship moving slightly astern, Figure 21 indicating an athwartships movement of the ship at medium speed to starboard with the stern swinging slightly to starboard, Figure 22 illustrating a forward movement of the ship at medium speed with the bow swinging slightly to port, and Figure 23 illustrating a situation in which the ship is moving athwartships to starboard and slightly astern at medium speed while the stern is swinging to starboard.

The twin cycloidal propeller installation consists of a pair of propellers arranged symmetrically at opposite sides of the center line FR of the vessel, and preferably an appreciable distance rearwardly of the center of resistance C of the hull of the vessel V as shown in Figures 12 to 23. Referring to Figure 1, the mechanism of each cycloidal propeller 1 is composed of a stationary casing within which the rotor 10 is rotated always unidirectionally by a suitable drive mechanism. Such rotor carries the angularly adjustable blades 11, together with appropriate blade turning mechanism 12 operable to vary the angle of each blade about its own axis as it is rotated with the rotor, for maintaining the desired angular relationship between the several blades of the propeller in their various rotative positions. Such mechanism can be adjusted to turn all the blades simultaneously through equal angles by operation of the thrust direction control mechanism 13. Such blade turning mechanism and thrust direction control mechanism are not part of the present invention. Moreover a twin installation of fixed pitch ratio cycloidal propellers is not new, this invention being concerned entirely with mechanism 2 operable to coordinate the directions of the thrusts produced by the twin cycyloidal propellers, by movement of the two propeller thrust direction controls 13, in the manner required to maneuver the vessel V as desired.

Also while the thrust coordinating mechanism 2 is illustrated as being connected with the thrust direction controls 13 by shafts 14, any of various types of motion duplicating transmissions may be employed instead of these shafts, such as a hydraulic pump and motor installation, a self-synchronous electric motor drive or a compressed-air transmission system. The only essential feature is that a given movement of the thrust coordinating mechanism be transformed into corresponding movement of the thrust direction controls to effect the proper angular change of the blades of both cycloidal propellers to alter their thrust directions in the sense and to the degree corresponding to movement of the thrust coordinator.

The thrust coordinating mechanism 2 includes a pantograph linkage composed of the supporting arms or links 20 and 21, which carry by one end the supported links 22 and 23, respectively. The other ends of these supported links are connected together for conjoint movement by a handle 24 pivotally mounted at their junction. In the installation shown the supporting link 20 is operatively connected to the port cycloidal propeller, so that when swung it will adjust angularly the thrust direction of such propeller. The supporting link 21, on the contrary, is operatively connected to the starboard propeller so that swinging of such link will adjust angularly the thrust direction of that propeller. The supporting links 20 and 21 are of equal effective length, and supported links 22 and 23 are also of equal effective length and preferably equal to that of links 20 and 21. Since these links are pivotally interconnected, the four links together form a pantograph linkage swingable and deformable by movement of handle 24.

Links 20 and 21 are designated supporting links because they may constitute the entire support for the supported links 22 and 23, as shown diagrammatically in Fig. 2. It should be understood, however, that such designation of these links does not preclude the provision of auxiliary supporting mechanism for the links 22 and 23, or for the handle 24, or for both, as long as such handle may be moved universally about the pivot axis of links 20 and 21. The port propeller arm 20 is secured to a sleeve 25 rotatably mounted upon a shaft 26, to which shaft the starboard propeller arm 21 is secured. These shafts and the pivots interconnecting the several links preferably are arranged so that links 20 and 21 may cross over each other, the pivot joining links 21 and 23 passing above that joining links 20 and 22. To assist crossing movement of these links or to prevent such crossing inadvertently, it may be desirable to provide an auxiliary control handle 27 at or near the pivotal connection between links 21 and 23.

The mechanism for connecting sleeve 25 to the port propeller thrust direction control shaft 14 may include an upper gear 28 carried by such sleeve which meshes with a gear 15 to drive a stub shaft 16. Similarly shaft 26 carries the lower gear 29, which meshes with the gear 15 of the starboard propeller thrust direction control to drive its shaft 16. In each thrust direction control, between the stub shaft 16 and the transmission shaft 14, suitable drive reduction mechanism 17 is interposed to effect the desired ratio of movement between the angular travel of arms 20 and 21 and the angular adjustment of the propeller blades.

In the operation of cycloidal propellers of the type with which my control mechanism is intended to be used, an adjustment of all the blades of a propeller simultaneously, each through the same given angle relative to the radius of the propeller through the position of such blade, will effect a shift in the direction of thrust produced by the propeller through twice as great an angle. Since it is preferred that the angle of swing of each of links 20 and 21 be equal to the shift in thrust direction of its corresponding propeller, it is necessary to effect a two-to-one reduction in drive ratio between each of sleeve 25 and shaft 26 and the blade turning mechanism of the corresponding propeller. If a connection with such a drive ratio reduction is employed, the port link or arm 20 will always point in the direction opposite that in which the thrust of the port propeller acts, and the starboard link or arm 21 will always point in the direction opposite that in which the thrust of the starboard propeller acts.

In order to describe more readily the operation and characteristics of my propeller thrust direction coordinating mechanism, I have shown in Figures 3 to 23, inclusive, diagrammatic representations of the twin cycloidal propellers, assumed to be of the fixed, $\pi$ pitch ratio type for purposes of this discussion, and a diagrammatic representation of the thrust coordinator and of the thrust coordinator reference chart 3.

The most elaborate diagram of the propeller and thrust coordinating mechanism installation is Figure 3. The port and starboard propellers 1 are shown as including the blades 11 and the blade turning mechanism 12. Simultaneous adjustment of the angles of all blades is effected by turning the central gear 12' which, in turn, revolves the idler gears interengaged between such central gear and the gears respectively fixed to the several blades 11. The arrows PR and SR indicate, respectively, the directions of rotation of the port and starboard propeller rotors.

In addition, the diagram of Figure 3 includes lines representing the pantograph links 20, 21, 22, and 23 overlying the reference chart 3 and arranged for maximum rearward thrust disposition of the blades of the two propellers. It will be noted that links 21 and 23 are not disposed exactly in overlying registry with links 20 and 22, respectively, as actually would be the case. Such disposition of the links is intended by this representation, but they have been shown slightly out of registry to render the four links visible. Handle 24 may be moved universally over the reference chart to control the propellers for driving the vessel in different directions and at varying speeds without altering the rotative speed of the propellers. Location of the handle on the marginal circle of chart 3 corresponds to the full speed condition of the resultant thrust T, in which situation the two individual propeller thrust vectors, PT of the port propeller and ST of the starboard propeller, are parallel and act in the same direction. The course arrow D indicates the direction of vessel travel produced by the resultant thrust. The reference chart shown has rectangular coordinates one set of which may be designated by suitable letters and the other by numbers for reference in setting the coordinator handle. Thus the captain or pilot may direct the helmsman to set the handle for a desired course and speed merely by calling out the coordinate reference characters of the location on the chart 3 where the helmsman should set the handle 24.

In marine cycloidal propeller installations it is necessary to displace the axes of symmetry of the two propellers slightly, as shown in Figures 4 and 5, in order to direct the port and starboard thrust vectors PT and ST exactly parallel, because of the slipstream effect resulting from rotation of the propellers in a viscous fluid. To reduce the speed of the vessel without decreasing the rotative speed of the propellers, the blade angles are changed to swing both thrust vectors inwardly so that they converge forwardly. With the thrust coordinator adjusted for full speed astern, as shown in Figure 5, the thrust vectors extend rearwardly in parallel relationship. Since minor alterations in the initial relationship of the axes of symmetry of the two propellers to dispose their thrust vectors exactly parallel in full speed ahead and full speed astern positions of the coordinator mechanism does not alter the principle upon which such mechanism operates, to simplify the following discussion of the manner in which it functions to maneuver a vessel in different ways it will be assumed that the axes of symmetry will be perpendicular to the thrust directions, as shown in Figure 3. Such relationship would exist if the propellers turned in a non-viscous fluid.

The directions of arms 20 and 21 may be altered by movement of coordinator handle 24 over the chart 3 in each of two ways: first, by movement of the handle toward or away from the coordinator reference point, which is the rotative axis of arms 20 and 21 at the center of the chart 3, designated radial movement of the handle, and, second, by movement of the handle around the coordinator reference point and at a constant distance from it, designated circumferential movement of the handle. Such radial movement of the handle swings arms 20 and 21 simultaneously and through equal angles in opposite directions. Such circumferential movement of handle 24 in any radially disposed position will swing both arms 20 and 21 simultaneously and through equal angles in the same direction. A combination of radial and circumferential movement of handle 24 may swing only one or both of arms 20 and 21, and such swinging may be in the same or in different directions, but the angle of swing of such links will be unequal. Since, as has been stated previously, a transmission mechanism between the thrust coordinator and the thrust direction control mechanisms of the two propellers is such that arm 20 is always parallel to the thrust vector PT of the port propeller, whereas arm 21 is always parallel to the thrust vector ST of the starboard propeller, the thrust vectors PT and ST will duplicate such swinging of the arms 20 and 21 described, both in direction and in degree to maintain such relationship.

As mentioned heretofore, as long as the propeller thrust vectors PT and ST of the port and starboard propellers, respectively, are parallel the net resultant thrust exerted on the vessel will be the algebraic sum of the two vectors, being additive if the vectors are in the same sense and being subtractive if they are in opposite senses. In the first situation the thrust coordinator handle will be at its extreme outer position and the point at which the resultant thrust intersects the longitudinal center line of the vessel will be midway between the rotative axes of the two propellers, at point O on line PS of Figure 3. In the second case mentioned above the thrust coordinator handle will be in registry with the coordinator reference point, the center of chart 3 as shown in Figure 9, the resultant thrust will be zero, and the point at which it intersects the center line of the vessel may be considered to be at infinity.

A different situation arises if the lines of the two propeller thrust vectors intersect, because, in that instance, not only must the magnitude and direction of the resultant thrust be taken into consideration, but also the location O at which the resultant thrust intersects the center line FR of the vessel will differ. To effect such relationship of the thrust vectors the coordinator handle 24 is disposed intermediate the coordinator reference point and the zone of maximum handle displacement from such point. The disposition of the resultant thrust center line intersection and the magnitude and direction of the resultant thrust vector corresponding to such different conditions will be considered in greater detail hereafter.

In order to manipulate the thrust coordinator so that the vessel will execute a left turn when proceeding forward it is only necessary to shift the coordinator handle 24 circumferentially clockwise from the position of Figure 3 to that of Figure 6. The thrust vectors PT and ST, following the angular displacement of arms 20 and 21 so that they will remain respectively parallel to such arms, assume the positions shown in Figure 6, in which they are still parallel. The resultant thrust will intersect the longitudinal center line of the vessel at point O midway between the propeller thrust vectors PT and ST, on line PS joining the rotative axes of the two propellers, and will be parallel to such vectors and of a magnitude equal to their arithmetic sum. The resultant thrust longitudinal vessel center line intersection O being astern of the center of resistance C of the vessel, assuming that the propellers as located in the vessel generally as shown in Figures 18 to 22, will swing its stern to starboard so that the vessel will turn to port as indicated by the course arrow D.

If, instead of moving the coordinator handle 24 circumferentially, it is merely shifted radially toward the coordinator reference point at the center of the circular chart 3, arm 20 will be swung through a given clockwise angle and arm 21 will be swung through an equal counterclockwise angle, as shown in Figure 7, the degree of such angular movements depending upon and being related directly to the extent of radially inward movement of the handle. The thrust vectors PT and ST, still remaining parallel to links 20 and 21, respectively, will diverge rearwardly, as shown, and will intersect at some location on the longitudinal center line FR of the vessel, designated $x$.

Since the point of intersection of the thrust vectors is on the longitudinal center line of the vessel the resultant thrust T, bisecting the angle between such vectors, will coincide with the vessel's center line, and the course arrow D will coincide with the center line of the vessel, as shown. Because the propeller thrust vectors intersect, however, components of these forces directed transversely of the vessel will oppose each other, so that the resultant forward thrust will be less than the arithmetic sum of the propeller thrust vectors PT and ST, and consequently less than the net resultant thrust exerted upon the vessel under the conditions illustrated in Figure 3, as indicated by the comparative lengths of the resultant thrust vectors. The effect of moving handle 24 radially inward toward the coordinator reference point without shifting it circumferentially, therefore, will be to decrease the resultant thrust without changing its direction, and consequently to reduce the speed of the vessel without altering its course, although the propeller speed remains unchanged.

If, following the radially inward shifting of handle 24 to the position of Figure 7, the handle is now moved circumferentially clockwise without being displaced radially, such as into the position shown in Figure 8, each of arms 20 and 21 will be swung clockwise through an angle equal to the arc through which handle 24 is shifted. Consequently the propeller thrust vectors PT and ST will be moved correspondingly clockwise so that the angle between them at their point of intersection X remains the same, and the net resultant thrust, which bisects such angle, will have been swung clockwise through the same angle as the propeller thrust vectors. Such resultant thrust will therefore remain parallel to and will extend in the direction of a line from the coordinator handle to the coordinator reference point at the center of the chart 3, and such relationship between the net resultant thrust vector and the line from the coordinator reference point to handle 24 will always exist.

Since the angle between the propeller thrust vectors remains constant in whatever circumferential position handle 24 may be placed, so long as it is not shifted radially, and further since the line PS subtending such angle and joining the rotative axes of the propellers does not change, it will be evident that the locus of the intersection point X of the propeller thrust vectors PT and ST, moved by shifting the coordinator handle 24 circumferentially at any given radial displacement of such handle from the coordinator reference point, is a definite circle passing through the rotative axes P and S of the propellers and crossing the longitudinal center line FR of the vessel at the intersection point X of the propeller vectors. While for every radially adjusted position of the handle 24 the line PS will constitute a chord of the circle locus of the vector intersection point X, the radius of the circle will vary in length with changes in the degree of radial displacement of the handle from the coordinator reference point.

As the handle is moved toward the coordinator reference point from the zone of maximum resultant thrust, the center of the locus circle initially will be forward of the line PS and its radius will decrease progressively until the handle reaches a position in which the angle between arms 21 and 22 is a right angle. The line PS then will be the diameter of the locus circle. As the handle is moved farther toward the coordinator reference point the center of the locus circle will pass from a position forward of the line PS to a position astern of that line, and the radius of the locus circle will thereafter increase progressively as the coordinator handle 24 is moved toward the coordinator reference point until it actually coincides with such point, as shown in Figure 9. In that position the radius of the locus circle of point X will be infinite.

As handle 24 is moved forward beyond the coordinator reference point the centers of the circular loci of the intersection point X of the propeller thrust vectors PT and ST again are located forward of the line PS, and their radii decrease as the handle is moved farther from the coordinator reference point until the angle between arms 20 and 21 is 90 degrees. Continued forward movement of the handle 24 will produce circular loci of point X having progressively increasing radii with their centers located rearwardly of the line PS.

As the coordinator handle is moved over the length of any diameter of chart 3, therefore, from one end to the other the circular loci of the propeller thrust vectors' intersection point having their centers at one side of the line joining the rotative axes of the propellers will diminish in size until such line becomes a diameter of the smallest such circle. As the handle movement continues such circles expand with their centers at the opposite side of such line until the handle reaches the center of chart 3. As the handle crosses the chart center the centers of such locus circles again lie on the first side of line PS, and the circles once more decrease in size to a minimum and then expand as before during movement of the handle from center of chart 3 to its periphery.

Stating in a different way the effect of moving the coordinator handle 24 from the periphery of the rear semicircular segment of chart 3 to the periphery of its front semicircular segment, the point at which the resultant thrust intersects the center line of the vessel, designated O in Figures 3 and 6, is midway between the rotative axes of the two propellers when the coordinator handle is on the periphery of such rear segment. As the handle is moved toward the coordinator reference point at the center of chart 3, with the arms 20 and 21 in the relationship shown in Figure 3, arm 20 constituting the clockwise leg and arm 21 the counterclockwise leg of the smaller angle between them, which may be termed the obverse relationship of such arms, the resultant thrust center line intersection will move from the center of line PS progressively rearward until the handle reaches the neutral position coincident with the coordinator reference point, as shown in Figure 9, when such resultant thrust center line intersection is at rearward infinity. During this travel such center line intersection is always the mid-point of the rearward arc of the corresponding thrust vectors' intersection locus circle.

As the handle passes across the coordinator reference point, the relationship of arms 20 and 21 will be switched to what may be termed their reverse relationship, arm 20 constituting the counterclockwise leg and arm 21 the clockwise leg of the smaller angle between them. As the handle is moved away from the coordinator reference point with arms 20 and 21 in this reverse relationship, the resultant thrust center line intersection will move rearwardly from forward infinity toward the line PS, coinciding always with the mid-point of the forward arc of the corresponding thrust vectors' intersection locus circle. Such movement of the resultant thrust center line intersection occurs entirely independently of the circumferential location of the coordinator handle 24 or any change in such circumferential location, a shift in such center line intersection being effected only by radial displacement of the coordinator handle.

At first glance it does not appear that the circle XPS of Figure 10 represents a locus corresponding to a position of handle P near the forward portion of the circumference of the reference chart 3. It will be noted, however, that arm 20 forms the counterclockwise leg and arm 21 the clockwise leg of the smaller angle between them, proving that the arms are in their reverse relationship. The disposition of the propeller thrust vectors shown in that figure may be obtained, therefore, by moving the thrust coordinator handle 24 from its position of Figure 3 through the neutral position of Figure 9, and then merely swinging it counterclockwise through an arc of 135 degrees. Each of the propeller thrust vectors and the resultant thrust vector T have thus been displaced through an equal angle of 180 degrees from their positions shown in Figure 13.

It is interesting to note that while the position of handle 24 in Figure 8 is exactly the same as in the diagram of Figure 10, the propeller thrust vectors PT and ST do not extend in the same directions, nor are the thrust vector intersection locus circles the same. It will be remembered that the disposition of the linkage shown in Figure 8 was accomplished merely by moving handle 24 circumferentially from the position shown in Figure 7 through a clockwise angle of 45 degrees. On the contrary, the disposition of the handle in Figure 10 was accomplished by first passing it forward along the longitudinal axis of the vessel through the neutral position of Figure 9, and then moving it arcuately counterclockwise from a forward position through an angle of 135 degrees. Such difference in handle movement effected an interchange in position of links 20 and 21 from obverse relationship despite the identical handle location in the two figures.

On the other hand, the handle 24 may merely be shifted from the position shown in Figure 7 through a counterclockwise angle of 135 degrees to dispose it in the right forward quadrant as in Figure 11, yet the intersection X of the propeller thrust vectors PT and ST will lie on the same locus circle XPS appearing in Figures 7 and 8. In the dispositions of handle 24 shown in Figures 8 and 11, 180 degrees apart, the intersection point X of the two thrust vectors PT and ST is at the same point on the circular locus, and in each instance that point is displaced 90 degrees from the longitudinal axis FR of the vessel. The reason for this is that the displacement of the intersection point X about the circumference of the circle is always twice as great as the angular shift of the control handle. This conclusion may be deduced in the following manner.

When the port propeller thrust vector PT in Figure 7 is swung from the position shown through a clockwise angle of 90 degrees, a continuation of its vector must necessarily intersect the locus circle XPS at the opposite end of its diameter formed by the longitudinal center line FR of the vessel, because the 90 degree angle of displacement must, according to geometrical principles, subtend a semicircular arc. The ratio between the angle of thrust vector swing and the arc which it subtends is thus two to one when the angle of swing is 90 degrees. That the same ratio applies for any other angle of swing is proven by the established principle of geometry that the number of degrees in a circular arc which subtends an angle in a circle is twice as great as the number of degrees in such subtended angle.

Since, as stated previously, each arm 20 and 21 is swung through the same angle as that through which handle 24 is displaced circumferentially, and since such arms are always parallel to the thrust vectors of their corresponding propellers, it follows that the propeller thrust vectors' intersection point X will be displaced around the vector circle circumference through an arc twice as great as the angle through which the handle 24 is moved circumferentially. In Figure 8 the handle has been moved through a clockwise angle of 45 degrees from its position of Figure 7, so that the vectors' intersection point X has shifted clockwise through an angle of 90 degrees from its position of Figure 7. In Figure 11 the handle has been moved counterclockwise through an angle of 135 degrees from its position of Figure 7, and the vectors' intersection point X has moved counterclockwise through an angle of 270 degrees from its position of Figure 7, which brings it to the same point as that shown in Figure 8.

Since the links 20 and 21 in Figure 11 extend respectively in directions diametrically opposite the directions of those links in Figure 8 the corresponding propeller thrust vectors PT and ST of Figure 11 likewise are directed, respectively, diametrically opposite to the propeller thrust vectors of Figure 8, although the thrusts act along the same lines. The result is that the net resultant thrust forces T are equal, and the resultant thrust intersects the center line FR of the vessel at the same point, the radial displacement of handle 24 being unchanged, namely, at the mid-point of the rear arc of the thrust vectors' intersection locus circle XPS, but such resultants act in opposite directions. The resultant thrust acting on the vessel under the conditions of Figure 8 swings its bow to port as it moves forward under reduced speed, whereas the resultant thrust of equal value acting on the vessel under the conditions of Figure 11 causes its stern to swing to port while it moves astern.

As suggested previously, disposition of the thrust coordinator handle 24 in a given position does not always insure that the net thrust conditions will be the same, as is shown by a comparison of Figures 8 and 10. The difference, however, is always merely an interchange of the thrust vectors of the two propellers, so that the theoretical value and direction of the resultant thrust will be the same in each case, and the only difference will be in the location along the center line of the vessel of the resultant thrust intersection with such line. Since as shown in Figure 8 the arms 20 and 21 are in their obverse relationship, such intersection point O in that instance is rearwardly of the line PS, whereas under the conditions of Figure 10 the arms 20 and 21 are in their reverse relationship so that the resultant center line intersection O is forward of the line PS. The net thrust on the vessel, though equal in the two cases, will act in the instance of Figure 8 at a point considerably rearwardly of the point at which the resultant thrust acts under the conditions represented by Figure 10.

While the action of the resultant thrust in the forward direction will be the same in the situations of Figures 8 and 10, therefore, the vessel will be turned more sharply by setting the thrust coordinator handle in the manner represented by Figure 8 than in that represented by Figure 10, because the resultant thrust, acting at a substantially greater distance from the center of resistance of the vessel in the situation of Figure 8 than in the situation of Figure 10, will have the benefit of a longer moment arm, producing a greater turning moment.

In Figure 13 the thrust coordinator handle is displaced radially from its neutral position approximately to the same degree as it is in the diagram of Figure 10, and the arms 20 and 21 are similarly in their reverse relationship. The handle is located as though shifted to the forward semicircular segment of chart 3 and then moved circumferentially in a clockwise direction through 45 degrees, to dispose it in the same position as shown in Figure 11. This would be the normal manipulation for effecting a reverse turn to port.

rather than the situation shown in Figure 11, although the latter condition actually would produce a sharper turn with the same net thrust acting. The reason for a sharper turn resulting from setting the handle in the manner described in connection with Figure 11 is, of course, that the center line intersection point O of the net resultant thrust is farther rearward, in that instance, being behind the line PS joining the propeller rotative axes, thus affording a longer moment arm between it and the center of resistance of the vessel V than arm M of Figure 13, and consequently a greater turning moment.

Following the principles, as explained above, of plotting the circular locus of the propeller thrust vectors' intersection point and of the travel of such point about that locus effected by circumferential movement of the control handle, additional positions of the thrust coordinator handle 24 may be investigated. During movement of the handle directly forward from its position of Figure 3 through its position of Figure 7 to its neutral or central position of Figure 9, the forward speed of the vessel will be reduced progressively because the components of the propeller thrusts directly transversely of the vessel will increase, and the longitudinal, unbalanced components will decrease until they become zero when the thrust coordinator handle has reached its central position. It is to be noted particularly that the rotative velocity of the propellers is not altered during such handle movement, but that the thrust vectors PT and ST of the port and starboard propellers balance each other by being directed diametrically oppositely.

As the handle 24 is moved across and radially outward from its neutral position, such as into a position like that shown in Figure 12, unbalanced components again are produced to form a net resultant thrust. If the handle is moved forward such resultant acts in the forward direction, instead of rearwardly. The degree of such forward thrust will, of course, increase as the handle is moved forward. For a given radial movement of the handle near the coordinator reference point at the center of chart 3, the change in magnitude of the resultant thrust will be great as compared to the effect on the resultant thrust of moving the handle to the same extent radially when it is farther from such point. Also the shift in position of the resultant thrust intersection along the longitudinal axis of the vessel effected by the same movement of the handle will be greater for positions of the handle closer to its neutral position.

Not only can turning of the vessel to port and starboard and its movement forward and rearward at different speeds be controlled by the simple movements of my thrust coordinator described above, but such coordinator may be manipulated to effect travel of the vessel directly athwartship, designated crabbing, or obliquely, without turning at all. Such maneuvers, however, can be effected at only one degree of radial displacement of the handle from neutral position, corresponding to a single value of resultant thrust. For such maneuvers the resultant thrust center line intersection O must coincide with the center of resistance C of the vessel. Such coincidence requires that the arms 20 and 21 be in their reverse relationship and that the handle be rather close to its neutral position, corresponding to a small resultant thrust and low speed. The closer line PS, joining the rotative axes of the propellers, is to the center of resistance C of the vessel, the farther will the crabbing position of the coordinator handle be from its neutral position, and consequently the greater will be the resultant thrust and vessel speed.

A crabbing maneuver may be executed from forward movement of the vessel by moving the thrust coordinator handle 24 forward from the position of Figures 3 and 7 through the neutral position of Figure 9 to a location in the forward semicircular segment of the reference chart circle 3, as shown in Figure 12. When the vessel has been brought substantially to a stop by such reversal of thrust direction, the coordinator handle may be moved circumferentially from the slow speed reversing position of Figure 12, at a radial spacing from the coordinator reference point at the center of chart 3 corresponding to the thrust vectors' intersection locus circle crossing the longitudinal axis of the vessel at its center of resistance C. Such movement may be, for example, in a clockwise direction through 90 degrees into the position shown in Figure 14. In that position the propeller thrusts PT and ST act in generally opposite senses with respect to their point of intersection O on the vessel's center line, the thrust vector PT acting in a direction away from such point and the thrust vector ST acting toward such point.

Because the resultant thrust vector T acts in the port direction at the point of intersection of the thrust vectors O, which is also the center of resistance C of the vessel, the vessel will move directly to starboard without swinging, as indicated by the course arrow D. Such resultant thrust acts parallel to the line joining the coordinator reference point at the center of chart 3 and handle 42, being directed toward the reference point.

This crabbing condition affords an excellent example of the effect of shifting the thrust intersection O along the center line of the vessel without altering the direction of the resultant thrust. In Figure 15 the position of handle 24, both radially and circumferentially, is the same as it is in the situation of Figure 14, and consequently the resultant thrust acts parallel to the line joining the coordinator reference point and handle 24, and is directed toward such point. In this instance, however, the arms or links 20 and 21 are in obverse relationship instead of in reverse relationship, effected such as by moving the handle from its position of Figure 7 toward its neutral position, and then before it reaches such position moving it clockwise circumferentially through an angle of 90 degrees.

Such radial disposition of the handle establishes the propeller thrust intersection locus circle XTS shown in Figure 15 instead of that shown in Figure 14, the resultant thrust center line intersection O on circle XTS being rearwardly of line PS because of the obverse relationship of links 20 and 21. While the two locus circles of Figures 14 and 15 are of equal radius, the resultant thrust intersection O of Figure 15 is displaced rearwardly of the center of resistance C of the vessel's hull twice the distance between such center of resistance and the line PS. Instead of the resultant thrust T directed transversely of the vessel acting on a zero moment arm about its center of resistance, therefore, as in Figure 14, to effect direct sidewise movement of the vessel without turning, the resultant thrust of Figure 15 acts at a long moment arm to swing the stern of the vessel quickly to starboard, as indicated by the course arrow D in Figure 15.

The greater the spacing of line PS from the center of resistance of the vessel's hull, of course, in the design of the vessel, the longer will be such moment arm, and the quicker the turning action.

Instead of passing handle 24 forward through its neutral position from its position of Figure 3 or Figure 7 and then shifting it circumferentially, links 20 and 21 can be disposed in the reverse relationship of Figure 14 by crossing the links when they are in the position of Figure 3. The auxiliary handle 27 can be utilized to assist in such crossing action. The links may then be positioned by moving the handle radially inward and circumferentially clockwise through 90 degrees into the position of Figure 14, such radial and circumferential movement being effected either sequentially or in a single universal movement.

The propeller thrust vectors' intersection point X may be moved around the circle XPS of Figure 14, which passes through the center of resistance C of the vessel's hull, by shifting handle 24 circumferentially without radial movement. For all such circumferentially adjusted positions of the handle the resultant thrust center line intersection is stationary, namely, the point at which the forward arc of the locus circle XPS crosses the center line of the vessel, which point coincides with the hull's center of resistance. In whatever circumferential position the handle 24 may be placed, therefore, the vessel will be moved in a straight line. In the positions of handle 24 shown in Figures 16 and 17, for example, the vessel will move rearwardly obliquely and forwardly obliquely, respectively, but it will not be swung in either case because the resultant thrust does not act through a moment arm about point C.

On the contrary if the thrust coordinator handle 24 is moved radially inward slightly, as shown in Figure 18, the radius of the circular locus of the propeller thrust vectors' intersection will be increased so that the net resultant thrust will act at a point considerably forward of the center of resistance of the vessel C, whatever may be the circumferential position of the coordinator handle. While with the handle in the position of Figure 18 the resultant thrust will act directly transversely of the vessel, its bow will be swung to starboard, as indicated by the arrow D, because such thrust acts on a moment arm M forward of the vessel's center of resistance. Consequently it will be evident that the rate of linear movement of the vessel laterally or obliquely cannot be reduced by shifting the handle toward the coordinator reference point without the vessel immediately beginning to swing in one direction or the other, even though the handle 24 is not displaced radially.

Nor can the handle be shifted circumferentially in such reduced speed radial position to correct those swinging tendencies, because such circumferential movement of the control handle does not change the location of the resultant thrust intersection along the center line of the vessel, but merely the direction of the resultant thrust to remain parallel with the line through handle 24 and the coordinator reference point. Thus the tendency of the vessel's bow to swing to starboard, illustrated in Figure 18, is not overcome by circumferential movement of the coordinator handle in a counterclockwise direction to the position of Figure 19, as shown by course arrow D, although the turning moment is somewhat less because of the slightly shorter moment arm M shown.

On the contrary, swinging of the bow to starboard during sidewise movement of the vessel to starboard is not augmented even by clockwise circumferential movement of the handle from the position of Figure 18, as is suggested by course arrow D in the diagram of Figure 20. While, again, the direction of the resultant thrust T is changed, the point on the center line of the vessel at which such thrust cuts remains the same, assuming that the coordinator handle 24 has not been shifted radially. Consequently the length of the moment arm M on which the thrust acts is slightly shorter, as it is in the situation of Figure 19, and the moment itself is somewhat smaller, although the general direction of movement of the vessel is altered appreciably.

Likewise the speed of crabbing or oblique movement of the vessel cannot be accelerated by radially outward movement of the thrust coordinator handle 24 from the position of Figure 14 without swinging the bow away from the crabbing direction. Thus, as illustrated in Figure 21, movement of the handle from the starboard crabbing position of Figure 14 away from the coordinator reference point will effect a rearward shift of the thrust intersection O to a location a substantial distance astern of the center of resistance C of the vessel. The increased lateral resultant thrust T acting at such thrust intersection to effect starboard sidewise movement of the vessel will also swing the stern to starboard, as indicated by the course arrow D, the bow swinging to port.

No matter how far the handle 24 may be shifted circumferentially in a counterclockwise direction without radial displacement, while some sidewise resultant thrust is still produced, the thrust intersection O will remain in the same location as shown in Figure 22, causing any such sidewise thrust to swing the stern of the vessel to starboard, as represented by the course arrow D in Figure 22. By displacement of the handle circumferentially through approximately 85 degrees from the direct lateral thrust position of Figure 21, the resultant thrust T will, of course, be altered to a direction principally forward, as shown in Figure 22, instead of sidewise, to effect forward movement of the vessel in a direction slightly oblique to starboard. The swinging of the stern to starboard will be slight because of the very short moment arm M on which the resultant thrust acts.

Conversely, if the control handle 24 is shifted, without radial displacement, circumferentially in a clockwise direction from its directly lateral position of Figure 21 to the position shown in Figure 23, for example, again the resultant thrust intersection O on the center line of the vessel is not shifted. Since the angle through which the handle is shifted is slight, the moment arm M of such force about the center of resistance of the vessel is not shortened appreciably, as shown. While the direction of movement of the vessel will be altered from directly sidewise to somewhat obliquely astern, in the direction of the course arrow D, the stern of the vessel will continue to swing to starboard almost as rapidly as when the thrust coordinator handle is in the position of Figure 21.

One further type of maneuver which may be effected by my thrust coordinating mechanism may be considered with reference to the illustration of Figure 9. With the coordinator handle disposed in the neutral position as shown in that figure, the equal thrust vectors of the two propellers will always be parallel and directed oppositely so that the net resultant thrust is zero, being the arithmetic difference of the thrusts PT and ST. That does not necessarily mean, however, that the vessel will never be subjected to a moving force when the handle is in a position coinciding with the coordinator reference point at the rotative axes of arms 20 and 21. On the contrary, the vessel will be subjected to zero force only when the links 20 and 21 extend athwartship, either in their positions of Figure 9 or displaced 180 degrees from such position.

When the arms are in their positions shown in Figure 9 the thrust vectors PT and ST are pointed oppositely outward in alignment, being directed like their corresponding arms which may be considered to be in their obverse relationship, whereas if these arms were swung through 180 degrees, which movement may be assisted by grasping handle 27, the thrust vectors PT and ST would be pointed exactly toward each other. Since arm 20, connected to the port propeller thrust direction control, is then at the starboard side of the coordinator reference point whereas arm 21, connected to the starboard propeller thrust direction control, is at the port side of the coordinator reference point, the arms in such case may be considered to be in their reverse relationship.

When the arms 20 and 21 extend in any other direction than athwartship with the handle 24 located in its neutral position, the vessel will pivot about the center of line PS joining the rotative axes of the propellers, without any translational movement, because the thrust couple created by the propeller thrusts PT and ST, being equal and acting at the spaced points P and S, respectively, creates only a turning moment. The moment arm of the couple, being the perpendicular distance between the lines of action of the thrust vectors, will increase in length as the arms 20 and 21 are swung in either direction toward the longitudinal axis FR of the vessel, corresponding to swinging of the propeller thrust vectors toward parallelism with such longitudinal axis.

If the arms 20 and 21 are swung in a clockwise direction from the position shown in Figure 9, the stern of the vessel will be swung to starboard and the bow to port about the midpoint of line PS. Conversely, if the links 20 and 21 are swung from the position of Figure 9 in a counterclockwise direction the stern of the vessel will be swung to port and the bow to starboard. The speed at which the vessel pivots will be accelerated as the arms 20 and 21 are displaced through 90 degrees, either by reason of the increasing length of the moment arm between the thrust vectors which passes through the midpoint of line PS or the increasing length of the fore and aft components of the thrust vectors, and the value of the thrust couple will decrease as swinging of the arms progresses through a further 90 degrees. If swinging of the arms is continued in either direction the rotative direction of the thrust couple will be reversed, so that the vessel will pivot in the opposite direction, the thrust couple increasing during such swinging through the third quadrant and again decreasing to zero during their movement through the fourth quadrant back to their original positions of Figure 9.

As will be understood from the foregoing discussion, therefore, for each radial position of the thrust coordinator handle 24 relative to its neutral position in coincidence with the coordinator reference point at the center of the reference chart 3, there are two possible locations of the resultant thrust intersection O on the center line of the vessel FR, one rearward of the line PS joining the rotative axes of the propellers when the arms 20 and 21 are in obverse relationship, and the other forward of such line when the arms 20 and 21 are in reverse relationship, except that when the thrust forces are parallel, the resultant thrust intersection O is on the line PS. Whether the resultant thrust intersection is forward or rearward of the line PS depends upon the relationship of the links 20 and 21, as mentioned above. The resultant thrust intersection will coincide with the center of resistance C of the vessel's hull when the thrust coordinator handle 24 is disposed in only one radial position, namely, that shown in Figures 12, 14, 16, and 17, and only then when the links 20 and 21 are in reverse relationship, which relationship they assume either when the thrust coordinator handle is moved radially into the front semicircular segment of the reference chart 3, or when the links are crossed from their obverse relationship shown in Figure 3 into reverse relationship by manipulation of auxiliary handle 27.

In addition, it will be recognized that the closer the thrust control handle 24 is to the coordinator reference point at the center of the reference chart 3 when the links 20 and 21 are in their obverse relationship of Figure 3, the farther rearward of line PS will be the thrust intersection O, as illustrated by the condition shown in Figure 15, and consequently the greater will be the turning effect of any lateral thrust component in proportion to the total resultant thrust, because of the greater moment arm at which such thrust acts. Conversely the closer handle 24 is to the coordinator reference point when arms 20 and 21 are in their reverse relationship, the farther forward of line PS will be the resultant thrust center line intersection O.

By reason of the location of the resultant thrust center line intersection, a relatively abrupt turn of the vessel when moving forward at reduced speed may be accomplished by connecting the links 20 and 21 to the port and starboard propellers, respectively, and by rotating the propellers in the direction indicated, so that movement of the thrust coordinator handle 24 toward its neutral position causes the propeller thrust vectors PT and ST to converge forwardly, as shown in Figures 7 and 8. If link 20 were connected to control the starboard propeller and link 21 were connected to control the port propeller, instead of the connections being as shown, or if the rotative directions of both propellers were reversed, the resultant thrusts would diverge forwardly as in Figure 10, and the turning maneuverability of the vessel while moving forward at reduced speed would not be as great, because the moment arm at which the force acts would be shorter owing to the farther forward location of the resultant thrust center line intersection O.

Moreover, a more rapid turning action can be accomplished during reverse movement of the vessel at reduced speed corresponding to a given thrust by moving the thrust coordinator handle 24 circumferentially, either clockwise or counterclockwise, into the forward semicircular segment of the reference chart 3, as shown in Figure 11, instead of moving the handle radially through its neutral position, as shown in Figure 9, into a position corresponding to that shown in Figure 11, for example, which disposition is illustrated in Figure 13. The reason for such result again is the farther rearward disposition of the resultant thrust center line intersection, and hence the longer moment arm M of the resultant force, effected by maintenance of the arms 20 and 21 in obverse relationship.

I claim as my invention:

1. Thrust control mechanism for twin cycloidal propellers or the like, each having a thrust direction control adjustable to alter the direction of the thrust produced by its propeller, which mechanism comprises a first arm, means operatively connecting said first arm to the thrust direction control of one of the twin propellers to effect thrust direction altering adjustment thereof by swinging of said first arm for maintaining the thrust vector of such one propeller always parallel to said arm, a second arm operatively connecting said second arm to the thrust direction control of the other of the twin propellers to effect thrust direction altering movement thereof by swinging of said second arm for maintaining the thrust vector of such other propeller always parallel to said second arm, pivot means supporting said arms for swinging about a common rotative axis, a universally movable thrust coordinating handle, and means operatively connecting said handle to both of said arms, said handle being movable about such common rotative axis of said arms to effect conjoint swinging thereof, to adjust the thrust direction controls of both twin propellers conjointly for altering the thrust vectors of the two propellers simultaneously and through angles respectively equal to the angles of swing of said arms.

2. Thrust control mechanism as defined in claim 1, and a reference chart disposed generally concentrically with the common rotative axis of the arms and having coordinates thereon with which the handle is selectively registrable by movement thereof about such axis, such coordinates bearing indicia for reference in setting the control handle in registry therewith.

3. Thrust control mechanism as defined in claim 1, in which the means operatively connecting the handle to both arms includes two links interconnecting the handle and the respective arms to form pantograph linkage.

4. Thrust control mechanism as defined in claim 3, in which the two arms supported by the pivot means are disposed in offset relationship longitudinally of the pivot means for disposition thereof in registry and are guided by the pivot means for swinging of each in either direction out of registry with the other, and means carried by one of the links adapted to be grasped and moved by the helmsman to assist crossing movement of the arms from an obverse relationship into a reverse relationship.

5. Thrust control mechanism as defined in claim 3, in which the two arms are disposed in offset relationship longitudinally of the pivot means and the links are all of equal effective length, means supporting the links from their respective arms with each link disposed in offset relationship relative to its supporting arm longitudinally of the pivot means, and means interconnecting the links in offset relationship to each other longitudinally of the pivot means to enable the handle to be moved in coincidence with the common rotative axis of the arms, constituting the neutral position of the handle in which the thrust vectors of the two propellers are in parallel opposed relationship.

6. Thrust direction coordinating mechanism for twin propellers, comprising a thrust direction control for each propeller adjustable to alter the direction of the thrust it produces, an adjusting means operatively connected to each of said thrust direction controls and operable to effect thrust direction altering adjustment thereof, two members, means operatively connecting said two members, respectively, to said two adjusting means for altering the directions of thrust of the propellers corresponding to the movements of said members, respectively, a single control element, and means operatively interconnecting said control element and both of said two members, and operable by said control element to effect simultaneous movement of said two members oppositely, for altering the positions of said thrust direction controls of the two propellers simultaneously in opposite directions to produce a resultant thrust of a value less than the arithmetic sum of the two propeller thrusts.

7. The thrust direction coordinating mechanism defined in claim 6 in which the control element is operable to execute two different types of movement simultaneously, and the last mentioned means include linkage means incorporating links pivotally interconnected and pivotally connected, respectively, to the two members for movement relative thereto by the control element executing movement of one type and for movement conjointly with the two members by the control element executing movement of a different type.

8. Thrust direction coordinating mechanism for twin propellers, comprising a thrust direction control for each propeller adjustable to alter the direction of the thrust it produces adjusting means operatively connected to each of said thrust direction controls and operable to effect thrust direction altering adjustment thereof, two rotative members, means operatively connecting said two members, respectively, to said two adjusting means for altering the directions of thrust of the propellers corresponding to the angular movements of said members, respectively, a single control element spaced from a reference point and movable both circumferentially about and radially relative to such reference point, and means operatively interconnecting said control element and both of said two members, and movable by said control element moving radially relative to such reference point to effect simultaneous rotation of said two rotative members in opposite directions through equal angles, and further movable by said control element moving circumferentially about such reference point at a constant distance therefrom to effect simultaneous movement of said two members in like direction through equal angles.

9. Thrust direction coordinating mechanism for twin propellers, comprising a thrust direction control for each propeller adjustable to alter the direction of the thrust it produces, an adjusting means operatively connected to each of said thrust direction controls and operable to effect thrust direction altering adjustment thereof, two rotative members of equal effective radius, means operatively connecting said two members, respectively, to said two adjusting means for altering the directions of thrust of the propellers corresponding to the angular movements of said members, respectively, coaxial pivot means supporting said two rotative members for relative rotation about a common axis, a movable handle, and means operatively interconnecting said handle and both of said rotative members, and movable by said handle moving radially toward and across the common rotative axis of said pivot means to shift angularly said rotative members conjointly in opposite directions, for adjusting the thrust direction controls of the propellers to vary the magnitude and sense of the net resultant thrust produced by the twin propellers and the location along the center line of the vessel at which such net resultant thrust intersects such center line, and movable by said handle moving circumferentially around the common rotative axis of said pivot means to shift angularly said rotative members conjointly in the same direction, for adjusting the thrust direction controls of the propellers to alter the direction in which the net resultant thrust produced by the twin propellers acts.

10. Thrust direction coordinating mechanism for twin propellers, comprising a thrust direction control for each propeller adjustable to alter the direction of the thrust it produces, an adjusting means operatively connected to each of said thrust direction controls and operable to effect thrust direction altering adjustment thereof, two supporting links of equal length, means operatively connecting said two members, respectively, to said two adjusting means for maintaining the directions of thrust of the propellers always the same as their respectively corresponding links, pivot means supporting corresponding ends of said two supporting links for relative swinging of said links about a common axis, two supported links of equal effective length and equal to the effective lengths of said supporting links, means pivotally connecting said supported links by one end to the swinging ends of said supporting links, respectively, means interconnecting the other ends of said supported links, and a handle carried by said interconnecting means and movable radially toward and across the common rotative axis of said pivot means to swing said supporting links conjointly in opposite directions, for adjusting the thrust direction controls of the propellers to vary the magnitude and sense of the net resultant thrust produced by the twin propellers and the location along the center line of the vessel at which such net resultant thrust intersects such center line, and said handle being movable circumferentially around the common rotative axis of said pivot means to swing said supporting links conjointly in the same direction, for adjusting the thrust direction controls of the propellers to alter through an equal angles the direction in which the net resultant thrust produced by the twin propellers acts.

11. Thrust control mechanism as defined in claim 10, and a reference chart disposed generally concentrically with the common rotative axis of the pivot means and having coordinates thereon with which the handle is selectively registrable by movement thereof about such axis, such coordinates bearing indicia for reference in setting the control handle in registry therewith.

GEORGE F. SCHNEIDER.

REFERENCES CITED

The following references are of record in the file of this patent:

UNITED STATES PATENTS

| Number | Name | Date |
| --- | --- | --- |
| 150,956 | Hunter | May 19, 1874 |
| 1,870,674 | Ehrhart | Aug. 9, 1932 |
| 2,497,127 | Lecarme | Feb. 14, 1950 |

FOREIGN PATENTS

| Number | Country | Date |
| --- | --- | --- |
| 221,483 | Great Britain | July 23, 1924 |
| 298,069 | Italy | June 27, 1932 |